Jan. 12, 1954

M. BEAN ET AL 2,665,967

STEEL BANDED ALUMINUM MOLD

Filed Oct. 9, 1950

INVENTORS
Morris Bean
William Beatty
BY
Curtis, Morris & Safford
ATTORNEYS

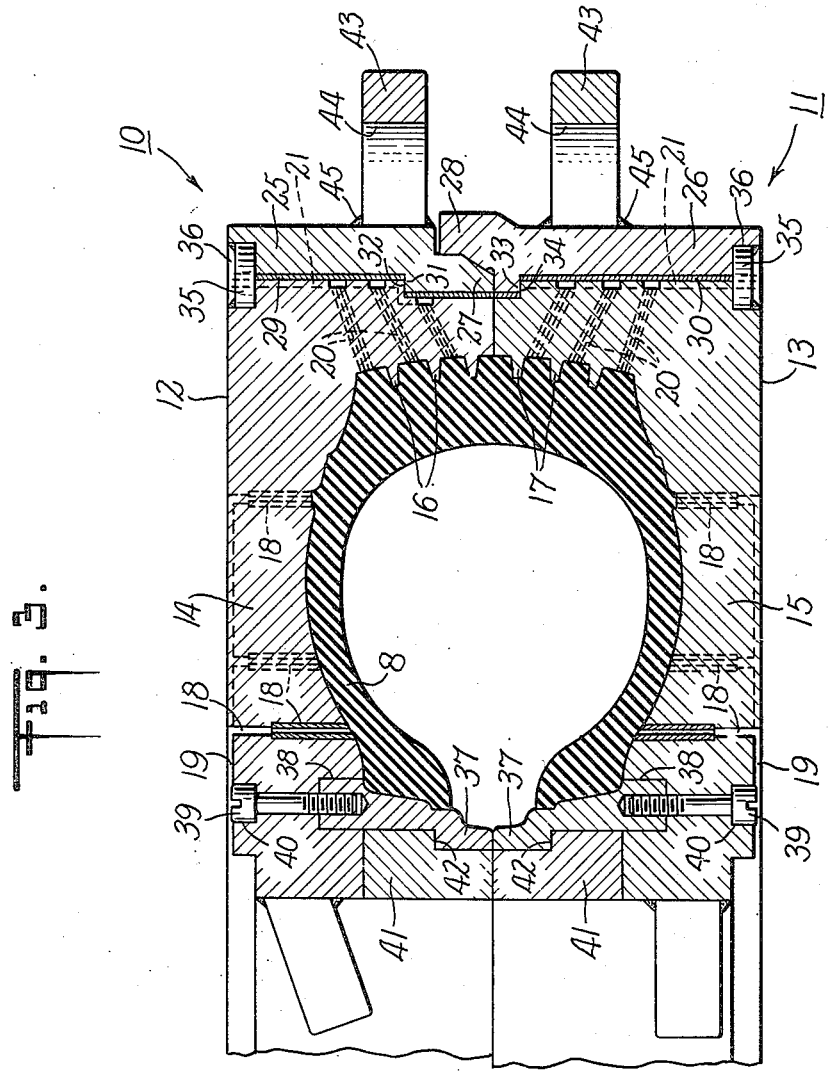

Patented Jan. 12, 1954

2,665,967

UNITED STATES PATENT OFFICE 2,665,967

STEEL BANDED ALUMINUM MOLD

Morris Bean and William Beatty, Yellow Springs, Ohio, assignors to Morris Bean & Company, Yellow Springs, Ohio, a corporation of Ohio Application October 9, 1950, Serial No. 189,094

7 Claims. (Cl. 18—47)

This invention relates to large aluminum castings for use in cookers or other conditions of alternating high temperatures and corrosive conditions, and more particularly to molds for vulcanizing pneumatic tire casings.

Aluminum castings, although they have many advantages for such uses, have generally been regarded as unsuited to heavy duty uses in corrosive conditions at alternative high temperatures, such as molds for pneumatic tires, largely because of the relative softness of the metal, which, in the handling of large molds, results in denting or otherwise distorting the interfitting or registering parts so that they do not thereafter properly close together. To overcome this difficulty it has been customary to use composite tire molds consisting of heavy steel rings having aluminum inserts fitted therein for the purpose of molding the tread pattern. Such composite molds have not been entirely satisfactory and in particular it has been found that corrosion tends to occur at the interface between steel and aluminum to such an extent that the softer aluminum is crowded away from the steel and the aluminum mold face is distorted. When this occurs the mold castings have to be replaced, at a considerable expense.

The reason for their deterioration is partly due to the difference of thermal expansion between the aluminum and steel, when heated from room to the vulcanizing temperature, e. g., about 325° F. The problem is complicated by corrosion, particularly in localities where waters are alkaline. The combination of corrosion and stress may, and in fact does, produce a very serious progressive deterioration substantially in the following manner.

Differential expansion or contraction opens up a crack between the aluminum and the steel. Electrolytic action between the two metals, especially in the presence of alkaline waters, causes corrosion within the crack and partially fills the crack so that, when temperature returns to normal, a stress is set up. In subsequent use the differential thermal expansion again opens the crack and corrosion again fills it in. Thus after each filling in, the subsequent contraction causes a stress beyond the elastic limit of the aluminum and consequently progressive deformation results.

An object of the invention is to provide a simple and rugged composite mold which will be substantially free from the deleterious effects of such differential expansion and contraction and corrosion.

A further object is to provide a composite mold which in use will be substantially free from the formation of cracks between the surfaces of its contiguous parts. A further object is to avoid electrolytic action and corrosion at the interface between different metals in such a composite structure.

Other objects will be in part obvious and in part pointed out hereinafter.

The invention accordingly consists in the features of construction, combinations of elements, and arrangement of parts as will be hereinafter described, and the scope of the application of which will be indicated in the following claims.

In the accompanying drawings in which is shown one of the possible embodiments of the invention:

Fig. 3 is a vertical cross section taken through the two parts of the mold annulus substantially on the line 3—3 of Fig. 2.

Figure 1:
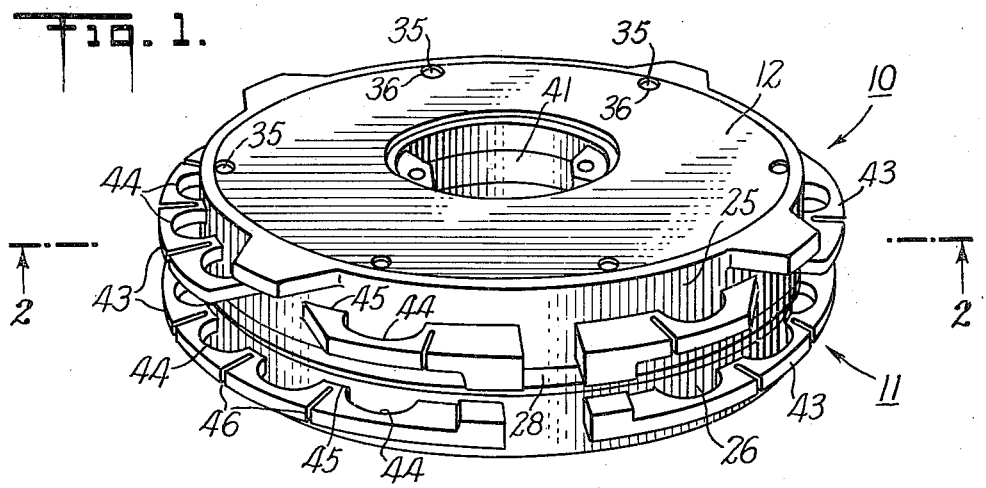
Fig. 1 is a perspective view of the mold with its two halves in suitable juxtaposition for use in vulcanizing apparatus.
Figure 2:
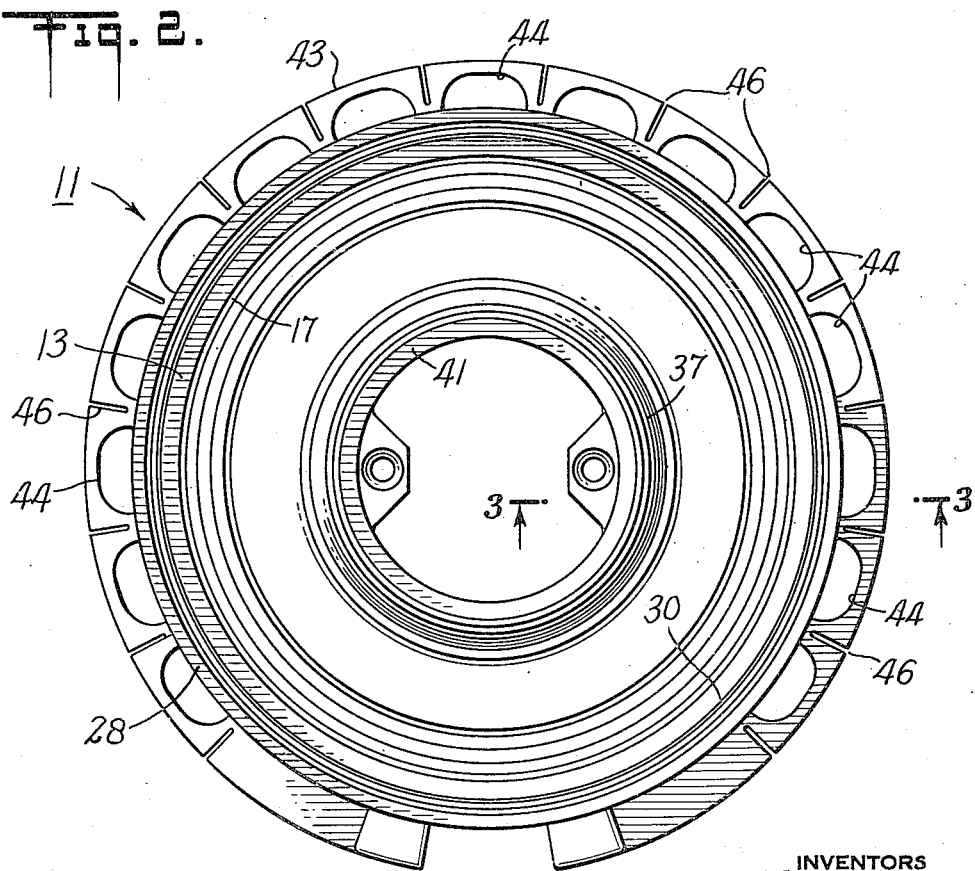
Fig. 2 is a plan view of the lower half of the mold as indicated by the line 2—2 of Fig. 1.

Referring to the drawings, reference characters 10 and 11 indicate upper and lower mold halves of a form to receive a tire casing 8 therebetween. Each of these halves comprises an annular cast aluminum mold portion 12, 13 which is complete with side wall sections 14, 15 and tread sections 16, 17; and each half is provided with a plurality of vapor or gas vents 18 extending from inside the mold and connecting with a plurality of grooves 19 leading to the inner circumferential edge of the annulus. Other vents 20 extend from the interior of the tread portion of the mold and connect with grooves 21 leading across the peripheral surfaces of the castings.

In order to give the mold greater strength and to prevent balling or chipping of the interfitting parts, each cast aluminum member is surrounded by a steel band 25, 26 carrying interlocking male and female engaging parts 27, 28. Each of these steel bands has high elastic stretch and may be machined to a press fit at room temperature with its respective cast aluminum mold ring or may be shrunk thereon by heating moderately or by chilling the aluminum casting. The elastic properties of the steel ring are such that at the maximum temperature of normal use it has not exceeded its elastic limit. This effect is controlled, in part at least, by the ratio of the radial thicknesses of the two materials. The steel should be thin enough so that it can yield elastically to the thermal expansion force of the aluminum before that builds up to the elastic limit of the aluminum. With a 1 to 1 ratio of radial thicknesses respectively of the aluminum and the surrounding band of steel experiment has shown no permanent deformation. The steel can be of any practical thickness less than the 1 to 1 ratio, but with the thickness of the aluminum mold ring substantially less than the steel there is likely to be permanent deformation of the aluminum, resulting in a gap and corrosion.

The precise ratio will of course depend upon the particular alloys used and their respective elastic properties.

In the use of the steel banded mold, within the temperatures mentioned, the relatively high elastic stretch of the steel rings permits the steel to stretch without inelastic deformation when the aluminum molds expand within them, and by using relatively thin bands of steel the aluminum can expand and stretch the bands without deformation of the aluminum. Because of the stress between the elements, they remain tightly sealed, therefore tight against corrosion, as no cracks are opened up between them.

In the embodiment shown in the drawings, the steel bands are actually separated from the cast aluminum alloy of the mold halves by thin bands 29 and 30 of pure aluminum or other suitable material. These aluminum bands provide barriers against electrolytic action between the mold and the steel band, as the pure aluminum lowers the E. M. F. Cooperative shoulders 31, 32 and 33, 34 prevent movement of the steel bands away from the engaging surfaces of the mold halves, while a plurality of keys 35, fitted in spaced keyways 36 (see Figs. 1 and 3) and which are spot welded to the steel bands, prevent relative movement of the bands in the opposite direction, independently of the mold halves.

In order to take the heavy service of molding the beads of the tire, inner steel insert rings 37 called "toe rings" are provided. The cast aluminum mold half is grooved as at 38 to receive the toe ring and the latter is held in position by means of studs 39 which pass through the wall of the casting and threadedly engage the insert. The heads of studs 39 are received within counter bores 40. Each toe ring 37 is supported by an aluminum ring 41 fitting radially within it and interlocking therewith, as indicated by reference numeral 42. As the toe ring is supported by the much thicker aluminum ring 41 inside, the toe ring, when the mold is heated, does not pull away from the cast aluminum mold because the ring of aluminum stretches the steel toe ring holding it against the rest of the aluminum mold. The toe ring may be advantageously chrome plated to give it hardness.

Tire molds of this character usually have heavy slotted integral lifting rings surrounding them which extend out radially beyond the circumference of the mold so as to provide hand holds and eyes into which chain hoist hooks can be engaged for the purpose of handling. If such a ring were used with the present mold as in the prior art, it would give a much greater effective thickness to the steel band and thus defeat the purpose set forth above. In other words the band would not be sufficiently stretchable to avoid permanent distortion of the aluminum mold. In order to overcome this difficulty and still provide the usual lifting means, ring-like structures 43 surround the steel bands 25, 26, but each of these rings 43 is made as a series of arches 44 (see Fig. 1) with relatively narrow portions connecting with the steel band. Each arch is welded to the band or construction integral therewith at these contact points 45 and the ring is slotted radially between arches, as at 46, from the periphery almost up to the contact point, whereby expansion and contraction when the band is stretched and released can be absorbed in the slots 46 and in the bending of the arches 44.

From the foregoing it will be seen that this invention is one well adapted to accomplish the ends and objects hereinbefore set forth in a simple, practical and novel manner.

What we claim as new and wish to protect by Letters Patent is:

1. A mold for tire casings capable of being subjected without damage to vulcanizing heats comprising in combination, a pair of registering continuous cast aluminum mold rings each including integral matrix portions for forming the tire tread, and a steel band surrounding each aluminum mold ring, the radial thickness of the aluminum ring being substantially greater than that of the steel band.

2. A mold for tire casings capable of being subjected without damage to vulcanizing heats comprising in combination, a continuous cast aluminum ring or core and a steel band surrounding the aluminum ring, the elasticity of the steel being such that it can stretch without inelastic deformation to accommodate the thermal expansion of the aluminum, and its radial thickness relative to the radial thickness of the aluminum ring being sufficiently small so that it can stretch to accommodate this thermal expansion without inelastic deformation of the aluminum.

3. A mold for tire casings capable of being subjected without damage to vulcanizing heats comprising, in combination, a continuous cast aluminum alloy ring or core, a steel band surrounding the aluminum ring, the elasticity of the steel being such that it can stretch without inelastic deformation to accommodate the thermal expansion of the aluminum, and its radial thickness being sufficiently small so that it can stretch to accommodate this thermal expansion without inelastic deformation of the aluminum, and a guard ring of substantially pure aluminum, interposed between the aluminum casting and the steel band to serve as a barrier against direct electrolytic action between the casting and the band.

4. In a mold for tire casings capable of being subjected without harm to vulcanizing heats, in combination, a continuous cast aluminum core ring comprising tread and side wall-forming portions and extending radially inwardly beyond the bead of a tire casing disposed therein for treatment, a steel band surrounding the core ring, a steel bead-forming insert ring mounted in said core in operative relation to the bead portion of said casing, an aluminum ring disposed radially within said bead-forming ring and means for holding the several parts of the mold in relatively immovable juxtaposition.

5. In a mold for tire casings capable of being subjected without harm to vulcanizing heats, in combination, a continuous annular core comprising a cooperating pair of cast aluminum rings, each including side wall and tread-forming portions and extending radially inwardly beyond the bead of a treated tire casing, steel bead-forming rings inserted in said aluminum core rings in operative relation to the bead portion of the tire casing and steel bands of relatively small radial thickness having registering engagement parts surrounding said core rings normally in press fit relation thereto.

6. In a mold for tire casings capable of being subjected without harm to vulcanizing heats, in combination, an annular core comprising a cooperating pair of cast aluminum rings, each including side wall and tread-forming portions and extending radially inwardly beyond the bead of a treated tire casing, steel bead-forming rings inserted in said aluminum core rings in operative relation to the bead portion of the tire casing, steel bands having registering engagement parts surrounding said core rings normally in press fit relation thereto and lifting rings peripherally surrounding said steel bands, each lifting ring comprising a series of arched portions having relatively small arcs in welded contact or formed integral with the exterior of its respective band and having radial slots formed between adjacent arched portions extending from the periphery of the lifting ring nearly to the points of welded contact with the steel band.

7. A mold for tire casings capable of being subjected without damage to vulcanizing heats comprising in combination a continuous annular core comprised of a cooperating pair of cast aluminum alloy rings, each including side wall and tread-forming portions and extending radially beyond the bead of a treated tire casing, steel bead-forming rings inserted in said aluminum core rings in operative relation to the bead portion of the tire casing, steel bands of relatively small radial thickness having registering engagement parts surrounding said core rings normally in press set relation thereto, and guard rings of substantially pure aluminum interposed between the aluminum castings and the steel bands to serve as a barrier against direct electrolytic action between the castings and the bands.

MORRIS BEAN.
WILLIAM BEATTY.

References Cited in the file of this patent

UNITED STATES PATENTS

| Number | Name | Date |
|---|---|---|
| 1,329,312 | Roberts | Jan. 27, 1920 |
| 1,638,023 | Willshaw | Aug. 9, 1927 |
| 1,834,899 | Grange | Dec. 1, 1931 |
| 1,868,959 | Willshaw et al. | July 26, 1932 |
| 1,943,947 | Bungay | Jan. 16, 1934 |